(12) United States Patent
Chen

(10) Patent No.: US 8,632,090 B2
(45) Date of Patent: Jan. 21, 2014

(54) COAXIAL TUBE HOLDER

(76) Inventor: Chih-Hsien Chen, Taichung (TW)

( * ) Notice: Subject to any disclaimer, the term of this patent is extended or adjusted under 35 U.S.C. 154(b) by 380 days.

(21) Appl. No.: 13/015,829

(22) Filed: Jan. 28, 2011

(65) Prior Publication Data

US 2012/0193888 A1 Aug. 2, 2012

(51) Int. Cl.
*B62K 21/18* (2006.01)

(52) U.S. Cl.
USPC .......................................................... 280/279

(58) Field of Classification Search
USPC ........................................ 280/279; 74/551.1
See application file for complete search history.

(56) References Cited

U.S. PATENT DOCUMENTS

| | | | | |
|---|---|---|---|---|
| 5,267,485 A | * | 12/1993 | Chi | 74/551.1 |
| 5,544,905 A | * | 8/1996 | Chen | 280/279 |
| 5,680,798 A | * | 10/1997 | Luen | 74/551.1 |
| 5,893,574 A | * | 4/1999 | Campagnolo | 280/279 |
| 5,964,474 A | * | 10/1999 | Chen | 280/279 |
| 6,431,575 B2 | * | 8/2002 | Campagnolo | 280/279 |

* cited by examiner

*Primary Examiner* — Paul N Dickson
*Assistant Examiner* — Daniel Yeagley
(74) *Attorney, Agent, or Firm* — Che-Yang Chen; Law Office of Michael Chen

(57) ABSTRACT

A coaxial tube holder is provided, which essentially has a holder major body having an aperture for tightening and holding fork tube of bicycle. The holder major body has an abutment segment provided on the bottom side thereof, which is abutted against bearing seat body of head tube. An ornamental cover is inserted outside the holder major body. Then the assembly can be finished very easily and securely between the head tube and the fork tube by the holder major body. Further, the ornamental cover can be made in different color or to be transparent, or to have decorative body having pattern, veins or characters images thereon, so that the overall design can be more novel and dazzling to attract more consumer groups to purchase. Hence, benefit of enhancing competitiveness of industry can be achieved.

9 Claims, 5 Drawing Sheets

COAXIAL TUBE HOLDER

BACKGROUND OF THE INVENTION

1. Field of the Invention

The present invention relates to a coaxial tube holder, more particularly to a coaxial tube holder by which the installation can be finished very easily and securely between the head tube and the fork tube of bicycle, and the overall design is made to be more novel and dazzling so as to attract more consumer groups to purchase by providing decorative body such as patterns, veins on an ornamental cover, and hence substantial benefit of enhancing competitiveness of industry is achieved.

2. Brief Description of Prior Art

In order to keep better control on bicycle riding, usually a headset is installed between the fork tube and the head tube. Referring to FIG. 5, in which a conventional headset (7) and a fork tube (8) are shown, the headset (7) comprises upper and lower cup sets (71), (72) in which the bearing seat bodies (711), (721) are respectively installed on the upper and lower ends of the head tube (9) of bicycle; then a lower cup (722) of the lower cup set (72) is assembled on the lower end of the head tube, while a cone shape grooved pad (712) is put on the upper end of the heat tube (9) before an upper cup (713) is overlaid thereon; the fork tube is in turn penetrated through the head tube (9); and then the lower cup set (72) is fixed on the lower end of the head tube (9); while on the upper cup set (71) side, the cone shape grooved pad (712) is shrunk by the pressing of an annular recess (714) so as to tighten the fork tube (8) in place. In this manner, the installation among the headset (7), the fork tube (8) and the head tube (9) are completed.

It is apparent that, from above description, the upper cup set (71) of the conventional headset (7) should be assembled with upper cup (713) by the assistance of the cone shape grooved pad (712) so as to achieve firm assembly effect. Accordingly, more components have to be used and thus overall cost and labor hour are high in assembly operation. Once the upper cup (713) and the grooved pad (712) are loosened, the effect of holding the fork tube (8) by the grooved pad (712) will disappear such that the entire assembly structure is also loosened. Furthermore, in order to render stiffness to the upper cup (713), metal material is the only choice for the upper cup (713) and the grooved pad (712), hence the overall shape looks so dull and monotonic. For consumer groups preferring novel, dazzling perception and wanting to emphasize features of individuals, groups or companies, this seems to be short of attraction.

In view of a lot of disadvantages found in the design of the upper cup set of conventional headset, the inventor of the present invention hereby proposes a coaxial tube holder of the present invention according to his research and development conducted on state-of-art improvement for the upper cup set of conventional headset based on the assistance of his abundant experience of R&D and manufacturing in relevant field and innovative thinking in many ways.

SUMMARY OF INVENTION

The main object of the present invention is essentially to provide a coaxial tube holder by which the installation can be finished very easily and securely between the head tube and the fork tube, and the overall design is made to be more novel, dazzling by providing decorative body such as patterns, veins on an ornamental cover, so as to attract more consumer groups to buy and to achieve benefit of enhancing competitiveness of industry.

In order to achieve above object, a coaxial tube holder is provided in the present invention, which essentially has a holder major body having an aperture for tightening and holding fork tube of bicycle in place; the holder major body further has an abutment segment provided on the bottom side thereof to abut against bearing seat body of head tube; and an ornamental cover is inserted outside the holder major body.

Configuring in this manner, the installation can be finished very easily and securely between the head tube and the fork tube by the holder major body; furthermore, the ornamental cover can be made in different color or to be transparent, or to have Decorative body such as patterns, veins or characters image thereon so that the overall design can be more novel, dazzling so as to attract more consumer groups to buy, and what's more, to enhance industrial competitiveness.

DETAILED DESCRIPTION OF PREFERRED EMBODIMENTS

The objects, the technical contents and the expected effectiveness of the present invention will become more apparent from the detailed description of the preferred embodiments in conjunction with the accompanying drawings.

Figure 1:
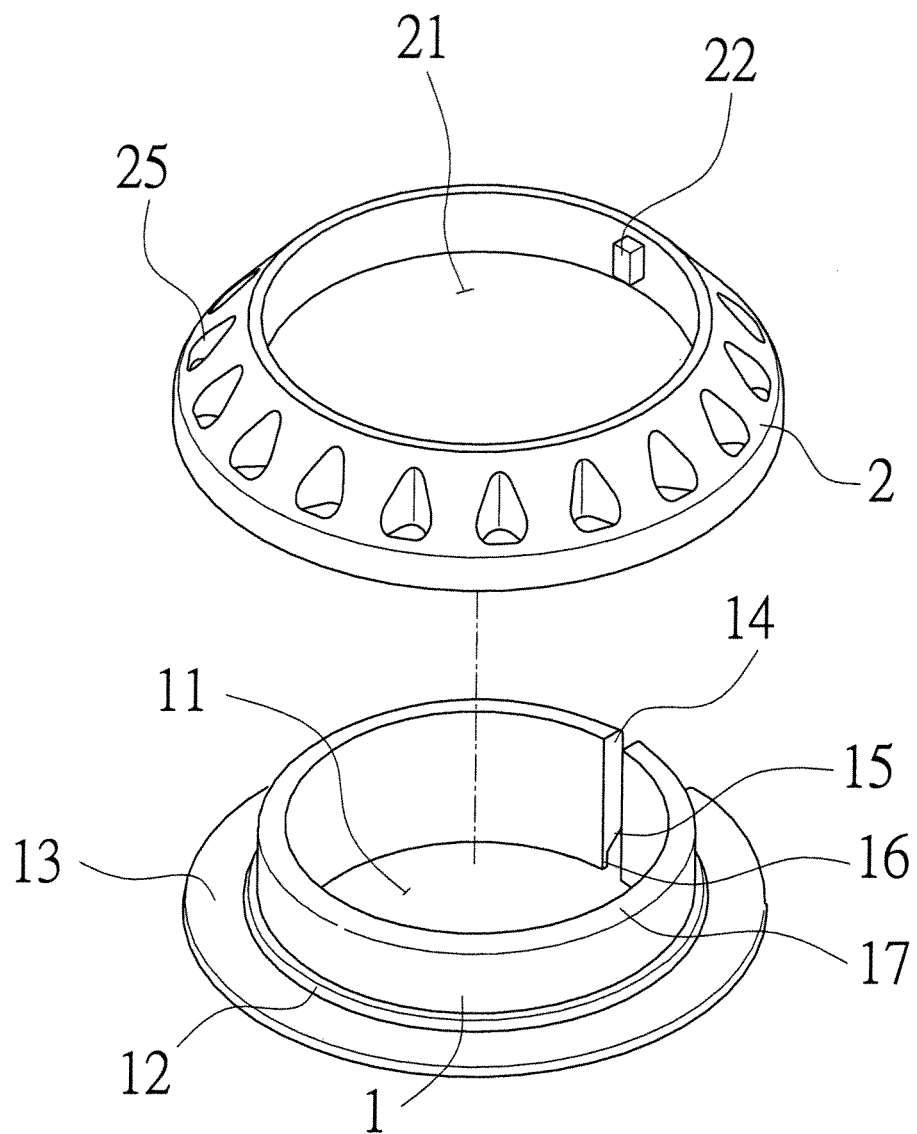
FIG. 1 is a perspective exploded view of the present invention.
Figure 4:
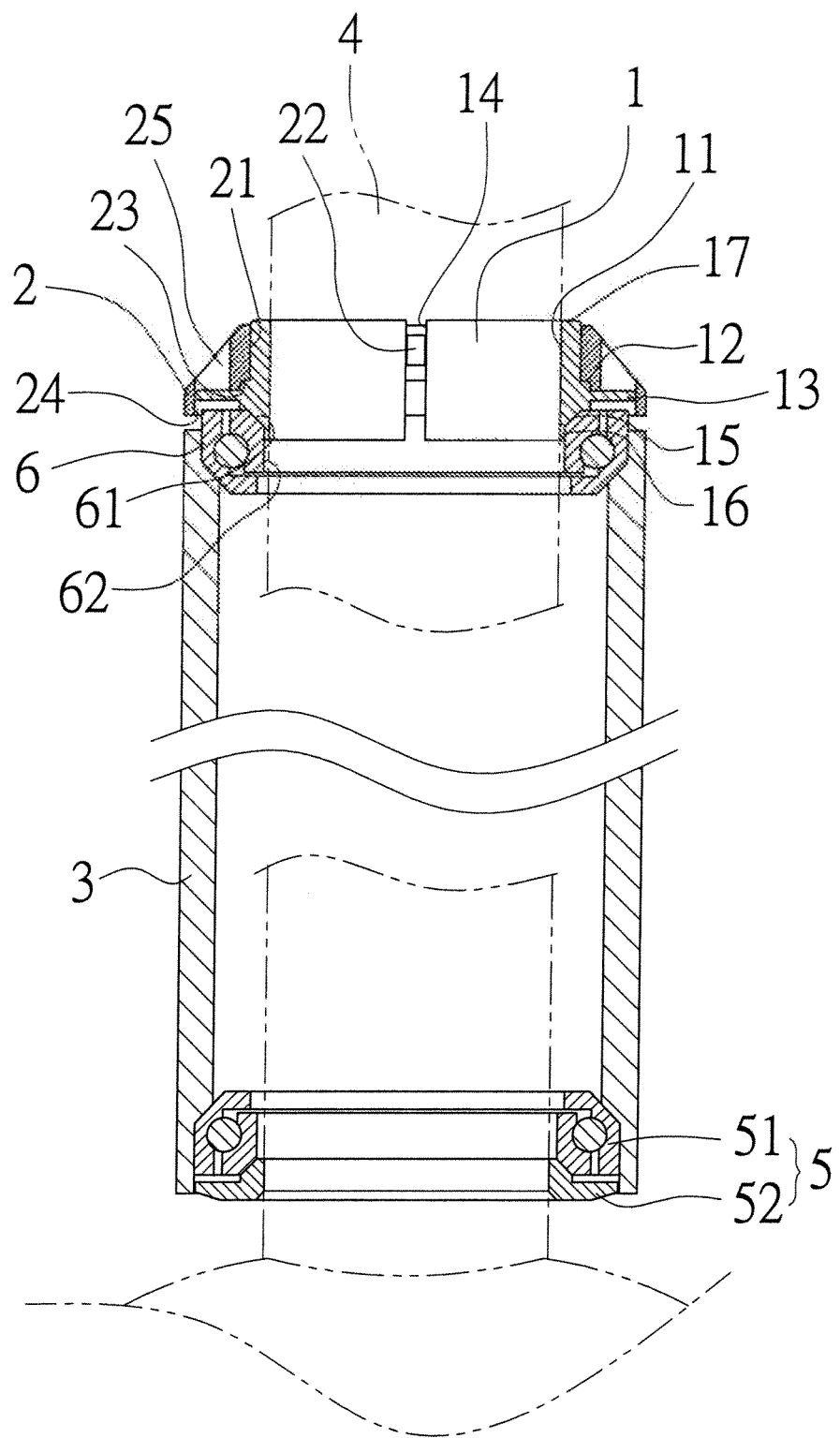
FIG. 4 is an assembled sectional view of the present invention.
Figure 5:
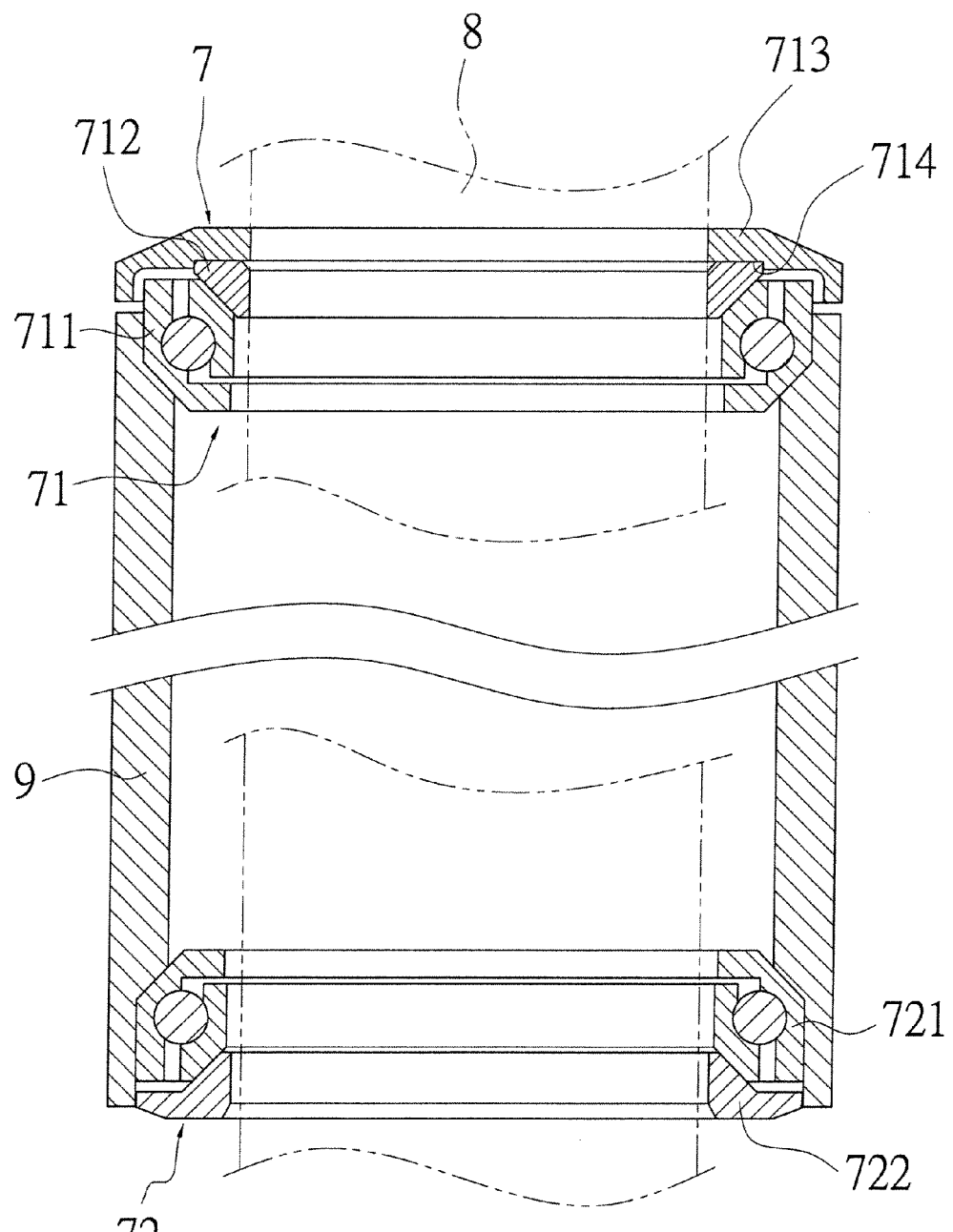
FIG. 5 is an assembled sectional view of a prior art.

Firstly referring to FIGS. 1 and 4, the coaxial tube holder of the present invention essentially consists of a holder major body (1) and an ornamental cover (2).

The holder major body (1) has an aperture (11) at its center, an annular step portion (12) integral with the outer wall thereof, and a positioning portion (13) extending in radial direction from the lower edge of the annular step portion (12). Further, a breach (14) extending along axial direction is provided on outer wall of the holder major body (1). A cone shape abutment segment (15) is provided on the bottom side of the holder major body (1) and a vertical segment (16) is further extended downwardly from the abutment segment (15). The holder major body (1) has a top flat surface (17).

The ornamental cover (2) is made of metal or non-metal. An aperture (21) is provided at its center for going through by the holder major body (1), and the top flat surface (17) of the holder major body (1) is thus protruded beyond the top end of the ornamental cover (2). An engaging block (22) is provided in the inner wall of the aperture (21) for engaging with the breach (14) of the holder major body (1). Further, an annular undercut (23) for abutting with the step portion (12) of the holder major body (1) is provided at the bottom edge of the aperture (21) of the ornamental cover (2); and a locating recess (24) is provided at the bottom of the ornamental cover (2) for engaging with the positioning portion (13) of the holder major body (1). Decorative body (25) is provided on the ornamental cover (2), which can be decorative patterns, characters, images or polygonal recesses.

Figure 2:
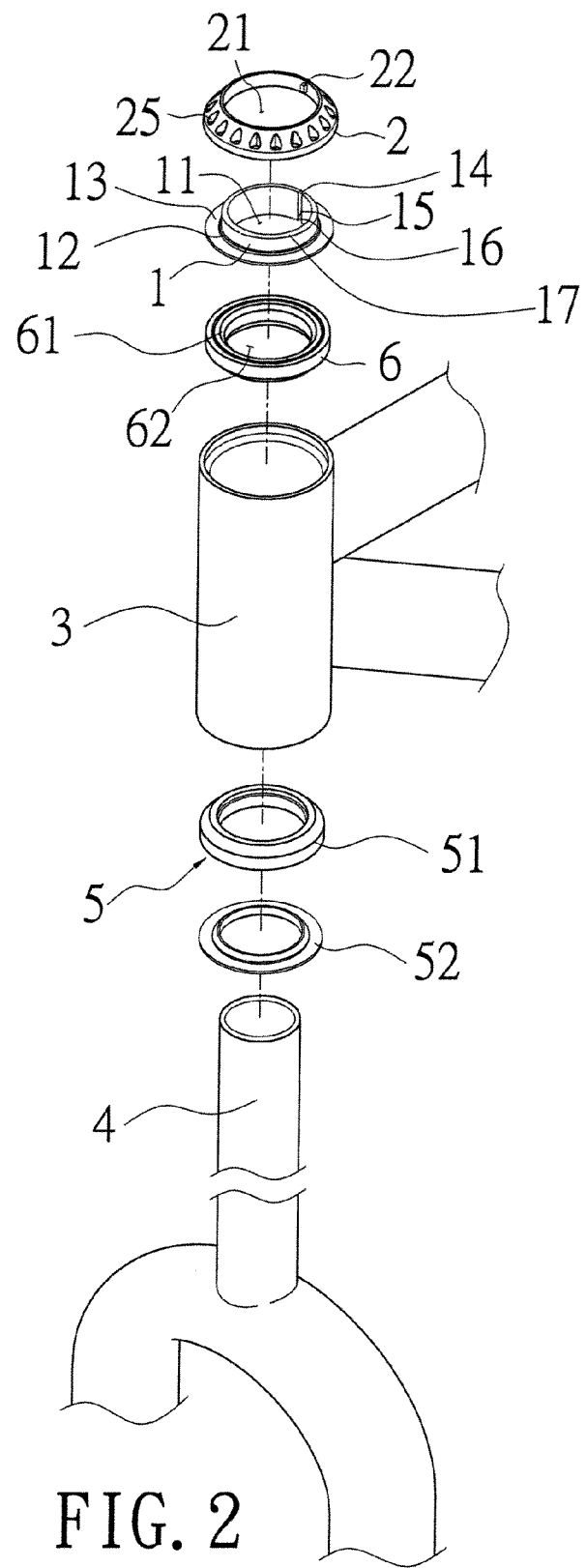
FIG. 2 is an assembled perspective exploded view of the present invention.
Figure 3:
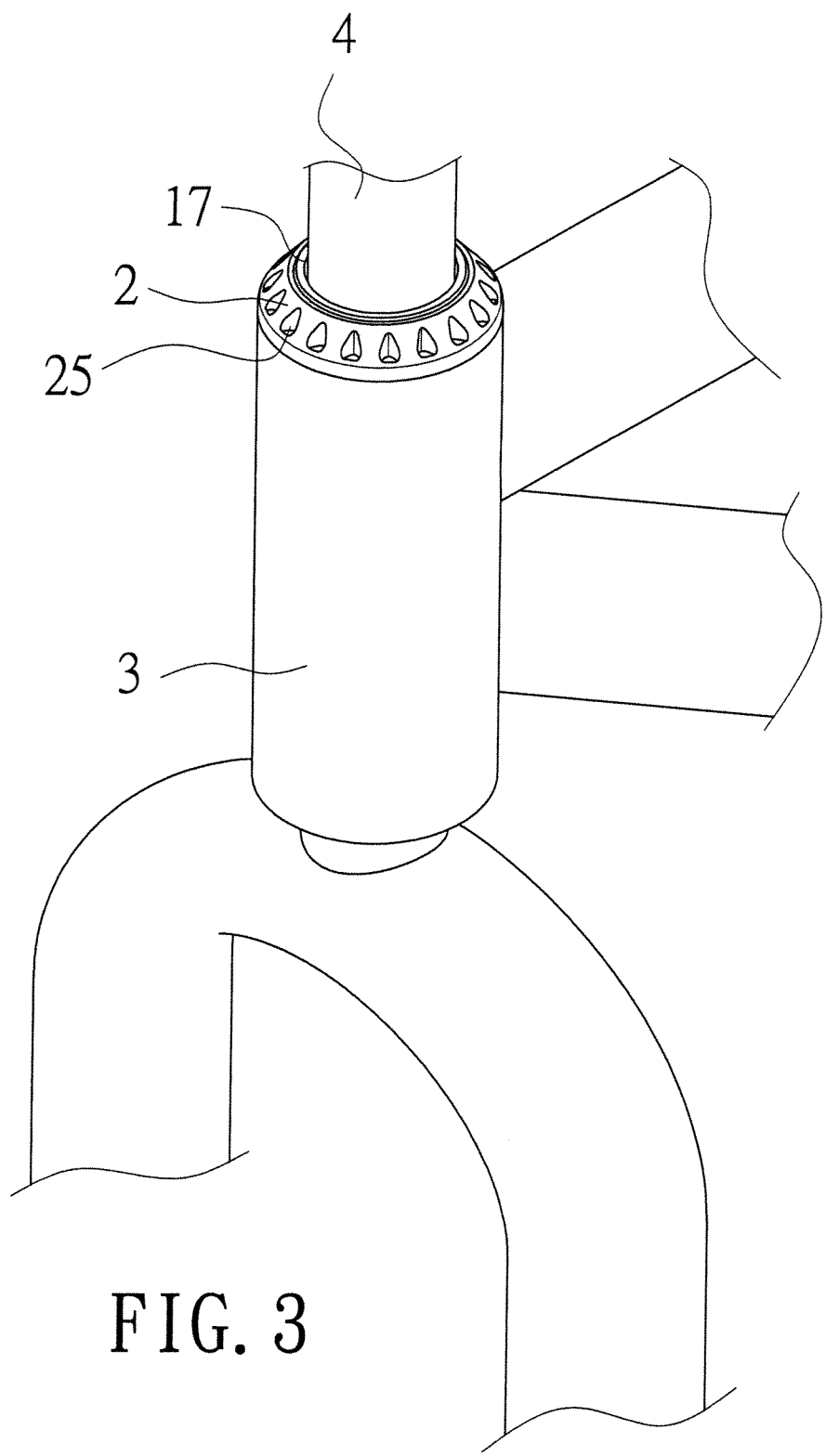
FIG. 3 is an assembled perspective view of the present invention.

In this manner, when assembly of the head tube (3) and the fork tube (4) is undertaken as shown in FIGS. 2 to 4, the bearing seat body (51) of the lower cup set (5) and the lower cup (52) are mounted on the bottom end of the head tube (3), and then another bearing seat body (6), the holder major body (1) and the ornamental cover (2) of the present invention are installed on the top end of the head tube (3). In turn, the fork tube (4) penetrates through the bearing seat body (51) of the lower cup set (5) and the lower cup (52) first, and then through the head tube (3), and finally goes out through another bearing seat body (6), the holder major body (1) and the ornamental cover (2). Next, the assembly of the lower cup set (5) and the head tube (3) is fixed, and then the cone shape abutment segment (15) on the bottom side of the holder major body (1) is abutted against the chamfered surface (61) of the bearing seat body (6), and the vertical segment (16) of the holder major body (1) is thus extended into the axial bore (62) of the bearing seat body (6) so that the inner wall of the aperture (11) of the holder major body (1) fits against the fork tube going through the aperture (11) tightly. Moreover, the ornamental cover (2) is then pushed into the holder major body (1) with the aperture (21) of the ornamental cover (2) fitted against the holder major body (1), and the top flat surface (17) is slightly protruded beyond the ornamental cover (2) so as to bear against the force applied from the other components during assembling. Further, the engaging block (22) on the inner wall of the aperture (21) engages with the breach (14) of the holder major body (1) for positioning; besides, the annular undercut (23) of the ornamental cover (2) abuts against the step portion (12) on the outer edge of the holder major body (1) and the locating recess (24) is correspondingly joined with the positioning portion (13), so as to form a firm combination. The axial breach (14) provided on the wall of the aperture (11) of the holder major body (1) is covered by the ornamental cover (2) so as to achieve complete harmony in overall appearance. If the oppressive force on the top flat surface (17) or its left or right side of the holder major body (1) increases, the holder major body (1) will shrink much more so as to firmly assembled with the fork tube (4).

Based on the previously mentioned assembly structure, this invention can accomplish the installation of the head tube (3) and the fork tube (4) merely by the adoption of the holder major body (1) in assembly process. Hence, the assembly process is much easier, labor saving and cost efficient, and the situation of loose-off will not occur. Further, the ornamental cover (2) can be made in different color or to be transparent, or to have polygonal decorative recesses and veins, or Decorative body (25) of characters and figure for identifying and for emphasizing the features of individuals, groups or companies so as to enhance overall novelty, dazzling effect and artistic perception. Accordingly, this can attract more specific consumer groups to purchase, and hence substantial benefit of enhancing competitiveness of industry can be achieved.

The coaxial tube holder of the present invention is not merely restricted to the usage of assembling the head tube and the fork tube of bicycle, it is also applicable to the coaxial shaft holding structure between concerned shafts of bicycle pedal, motorcycle or fitness equipments, and these are all considered to be within the scope of the present invention.

Based on foregoing, this invention apparently at least has following advantages.

1. The coaxial shaft holder of the present invention can accomplish the assembly of head tube and fork tube merely by adoption of holder major body. Hence, the assembly process is much easier, labor saving and cost efficient, and the situation of loose-off will not occur. Thus, firm assembly can be further ensured.

2. In the coaxial tube holder of the present invention, the axial breach provided on the wall of the aperture of the holder major body is covered by the ornamental cover so as to achieve complete harmony in overall appearance of the structure. As unexpected perception of imperfection of providing a breach on the coaxial tube holder will not happen, the overall artistic feeling is increased so as to achieve the benefit of attracting consumers to purchase.

3. The coaxial tube holder of the present invention further has an ornamental cover that can be made in different color or to be transparent, or to have decorative veins, or decorative body of characters and figure for identifying and for emphasizing the features of individuals, groups or companies so as to enhance overall novelty, dazzling effect and artistic perception. Accordingly, this can attract more specific consumer groups to purchase, and hence substantial benefit of enhancing competitiveness of industry can be achieved.

What is claimed is:

1. A coaxial tube holder, essentially comprising a holder major body (1) having a first aperture (11) provided at the center thereof, a breach (14) extending along axial direction provided on outer wall of said holder major body (1), an abutment segment (15) provided on the bottom side of said holder major body (1); further comprising an ornamental cover (2) having a second aperture (21) provided at the center thereof for going through by said holder major body (1), an engaging block (22) provided in the inner wall of said second aperture (21) for engaging with said breach (14) of said holder major body (1);

wherein the top end of said holder major body (1) is protruded beyond the ornamental cover (2).

2. The coaxial tube holder as claimed in claim 1, wherein said holder major body (1) is further provided with a positioning portion (13) extending in radial direction from the outer wall thereof.

3. The coaxial tube holder as claimed in claim 2, wherein said holder major body (1) further has an annular step portion (12) formed integral with the outer wall thereof and to be above said positioning portion (13).

4. The coaxial tube holder as claimed in claim 3, wherein said ornamental cover (2) further has a annular undercut (23) provided at the bottom edge of said second aperture (21) for abutting with said step portion (12) of said holder major body (1); and a locating recess (24) provided at the bottom of said ornamental cover (2) for engaging with said positioning portion (13) of said holder major body (1).

5. The coaxial tube holder as claimed in claim 4, wherein said abutment segment (15) is formed as cone shape and a vertical segment (16) is further extended downwardly from said cone shape abutment segment (15).

6. The coaxial tube holder as claimed in claim 2, wherein a locating recess (24) is provided at the bottom of said ornamental cover (2) for engaging with said positioning portion (13) of said holder major body (1).

7. The coaxial tube holder as claimed in claim 6, wherein said abutment segment (15) is formed as cone shape and a vertical segment (16) is further extended downwardly from said cone shape abutment segment (15).

8. The coaxial tube holder as claimed in claim 1, wherein said abutment segment (15) is formed as cone shape and a vertical segment (16) is further extended downwardly from said cone shape abutment segment (15).

9. The coaxial tube holder as claimed in claim 1, wherein said ornamental cover (2) is further provided with a decorative body (25).

* * * * *